United States Patent [19]

Klingelhoefer et al.

[11] Patent Number: 5,451,253
[45] Date of Patent: Sep. 19, 1995

[54] PREPARATION OF TRANSPARENT YELLOW IRON OXIDE PIGMENTS

[75] Inventors: Paul Klingelhoefer, Mannheim; Christoph Schwidetzky, Hassloch; Henning Wienand, Neulussheim; Norbert Mronga, Dossenheim; Ekkehard Schwab, Neustadt; Michael Nebel, Cologne, all of Germany

[73] Assignee: BASF Aktiengesellschaft, Ludwigshafen, Germany

[21] Appl. No.: 223,992

[22] Filed: Apr. 4, 1994

[30] Foreign Application Priority Data

Apr. 2, 1993 [DE] Germany .................. 43 10 864.4

[51] Int. Cl.⁶ .............................................. C09C 1/22
[52] U.S. Cl. ...................................... 106/456; 106/419; 106/459; 423/632; 423/633
[58] Field of Search ................ 106/419, 456, 459; 423/266, 632, 633

[56] References Cited

U.S. PATENT DOCUMENTS 2,558,302  6/1951  Marcot et al. .
3,918,985 11/1975  Ebenhoech et al. ............. 106/456
3,931,025  1/1976  Woditsch et al. ................ 106/419
4,560,544 12/1985  Nakata et al. .................... 423/266

FOREIGN PATENT DOCUMENTS 1219612 10/1962 Germany .
2034295  6/1980 United Kingdom .

OTHER PUBLICATIONS

Ullman's Encyclopedia of Industrial Chemistry, Vol. A20, Editors: Barbara Elvers, et al., (1992) no month p. 358, Paragraph 4.4.1. Transparent Iron Oxides.
Patent Abstracts of Japan, vol. 15, No. 341 (C–0863), Aug. 29, 1991, JP-A-3 131 525, Jun. 5, 1991.

Primary Examiner—Mark L. Bell
Assistant Examiner—Michael Marcheschi
Attorney, Agent, or Firm—Oblon, Spivak, McClelland, Maier & Neustadt

[57] ABSTRACT

A process for preparing transparent yellow iron oxide pigments by the precipitation of iron (II) hydroxide by adding an inorganic base to an iron (II) salt solution and subsequent oxidation to FeOOH.

8 Claims, No Drawings

PREPARATION OF TRANSPARENT YELLOW IRON OXIDE PIGMENTS

The present invention relates to a novel process for preparing transparent yellow iron oxide pigments by precipitation of iron(II) hydroxide by adding an inorganic base to an iron(II) salt solution and subsequent oxidation to FeOOH.

The present invention further relates to novel transparent yellow iron oxide pigments based on doped FeOOH, wherein the dopant comprises A) from 0.05 to 2% by weight of phosphorus in the form of phosphate and B) from 0.1 to 3% by weight of zinc, and to the use thereof for coloring polymeric material.

Iron oxide pigments are becoming increasingly important on account of their chemical stability, their lack of toxicity and their wide color spectrum ranging from yellow via orange, red and brown to black.

Of particular interest are the transparent iron oxide pigments, for example the transparent yellow pigment goethite ($\alpha$-FeOOH).

To have a transparent color, a pigment must have a certain particle size and particle morphology, which is why specific methods of preparation are required. For instance, transparent yellow iron oxide pigments are usually prepared by single-stage processes by first precipitating iron(II) hydroxide with a base from iron(II) salt solutions and then oxidizing it to FeOOH. To obtain the desired particle morphology, existing processes all require low reaction solution concentrations and low reaction temperatures. According to Ullmann's Encyclopedia of Industrial Chemistry (Fifth Edition, Vol. A 20 (1992), p. 358), for example, particularly good results are obtained on using 6% strength by weight iron(II) sulfate solutions and temperatures of below 25° C. More concentrated iron(II) salt solutions, moreover, usually lead to unstirrable reaction mixtures.

Also known are processes of preparations where crystal growth regulators are used (U.S. Pat. No. 2,558,302 and DE-A-1 219 612), but they too are carried out in a single stage only at temperatures below 40° C. and low concentrations.

It is true that it is possible to obtain coloristically satisfactory products under the conditions described, but the economics of existing processes leave something to be desired because of the low space-time yield.

It is an object of the present invention to make available coloristically useful transparent yellow iron oxide pigments in an economical manner.

We have found that this object is achieved by a process for preparing transparent yellow iron oxide pigments by precipitation of iron(II) hydroxide by adding an inorganic base to an iron(II) salt solution and subsequent oxidation to FeOOH, which comprises a) admixing an at least 0.5M aqueous iron(II) salt solution at from 25° to 45° C. in the presence of dissolved phosphates and optionally zinc salts initially with sufficient base to precipitate from 50 to 70% of the starting iron(II) ions in the form of the hydroxide and then passing oxidizing gas through the resulting mixture until the pH has fallen to a value <4.5, and b) then raising the temperature of the mixture to 50°–80° C. and, by further addition of base while a pH of from 4 to 6 is maintained and the simultaneous introduction of oxidizing gas, completing the precipitation of the iron in the form of FeOOH and then isolating the precipitated pigment from the aqueous suspension in a conventional manner.

We have also found transparent yellow iron oxide pigments based on doped FeOOH, wherein the dopant comprises A) from 0.05 to 2% by weight of phosphorus in the form of phosphate and B) from 0.1 to 3% by weight of zinc.

The present invention also provides for the use of these pigments for coloring polymeric material.

The process of the invention is a two-stage process involving specific temperature control.

In the first stage, at a low temperature, initially only part of the initially introduced iron(II) ions are precipitated with a base in the presence of phosphate and optionally zinc ions in the form of iron(II) hydroxide and then oxidized with an oxidizing gas to nuclei of $\alpha$-FeOOH.

In the second stage, the FeOOH nuclei formed in the first stage are made to grow by precipitating the remaining iron(II) onto the nuclei as FeOOH by continuously adding base at a higher temperature and a constant pH in the weakly acid range and at the same time blowing oxidizing gas into the reaction vessel.

In contradistinction to existing processes for preparing transparent yellow iron oxide pigments, the process of the invention can be operated at distinctly higher iron(II) salt concentrations without problems with the stirrability of the reaction batch. In general, the iron(II) salt solutions used are from 0.5 to 1.5 molar, preferably from 0.7 to 0.8 molar. It is of course also possible to use lower concentrations, but that would jeopardize the production economics.

Suitable iron(II) salts are those which are soluble in water; preference is given to iron(II) chloride and especially to iron(II) sulfate.

The dopants used are phosphates, preferably with zinc salts, but it is also possible to use phosphates alone. Again the water-soluble compounds are suitable.

Examples of preferred phosphates are orthophosphates such as sodium dihydrogenphosphate and phosphoric acid, preferably pyrophosphates such as sodium pyrophosphate and pyrophosphoric acid.

A suitable zinc salt, besides other soluble salts, is in particular zinc sulfate.

The phosphates and zinc salts used act as growth regulators, ie. they control the particle size and shape of the crystal nuclei being formed. The amount of these growth regulators must be adapted to the temperature in the first process step.

Generally, from 0.05 to 2, preferably from 0.5 to 1.5% by weight, based on FeOOH, of phosphorus is used as phosphate.

In the preferred version of the process, zinc salts are used in addition, in amounts of generally from 0.1 to 3, preferably from 0.75 to 1.25, % by weight of zinc, based on FeOOH.

The temperature in this first stage is generally from 25° to 45° C., preferably from 30° to 40° C.

Suitable inorganic bases are in particular alkali metal hydroxides and carbonates such as sodium hydroxide, potassium hydroxide, sodium carbonate and potassium carbonate, which are preferably added in aqueous solution.

The oxidizing gas is preferably air, but it is also possible to use other oxygen-contaning gas mixtures, for example with nitrogen. The amount of air introduced depends on the size of the vessel used, ranging for example in the case of a 10 l reactor generally from 500 to 1,000 l per h.

The first process step is advantageously carried out as follows:

The aqueous iron(II) salt and growth regulator solution is heated to the desired temperature under an inert gas, particularly nitrogen, then sufficient base is added to precipitate from about 50 to 70% of the iron as iron(II) hydroxide, and then air is passed through the reaction mixture until the pH has dropped to a value of generally <4.5, preferably <4.2, particularly preferably <4.0. The oxidation, which usually takes from 1 to 5 h, is then complete.

The temperature of the subsequent, second stage of the process, in which the precipitation of the iron is completed, is in general from 50° to 80° C., preferably from 65° to 80° C.

After the temperature increase the second step of the process is usually carried out by continuously adding base in order that a pH of generally from 4 to 6, preferably from 5 to 5.5, may be maintained and at the same time passing air into the reaction mixture. After a period of generally from 1 to 4 h, the precipitation of the iron in the form of FeOOH will be complete.

The product can then be isolated in a conventional manner by filtration, washing and drying.

For certain applications, for example for the production of waterborne coatings, it is advisable to coat the pigment products additionally with a phosphate. This coating can advantageously be carried out directly in the as-obtained aqueous suspension, but can also be carried out after isolation and redispersal in aqueous phase. The temperature for this coating step is not critical; it can be carried out for example directly in the hot reaction mixture or after prior cooling to room temperature.

Suitable for this coating are for example the above-mentioned phosphates, not only the orthophosphates but also the pyrophosphates, which are usually used in amounts of from about 0.1 to 1, preferably from 0.3 to 0.5, % by weight of phosphorus, based on the uncoated pigment.

This treatment generally takes not more than 2 h, preferably from 0.5 to 1 h.

The process of the invention gives a uniform pigment product that has excellent application properties. Moreover, the process has a high space/time yield of from about 15 to 35 g of FeOOH/l·h and hence good economics.

The novel transparent yellow iron pigments of the invention comprise doped FeOOH. The FeOOH is virtually all α-FeOOH, other forms such as γ-FeOOH or α-Fe$_2$O$_3$ being generally present only in traces, if at all.

The dopant generally comprises from 0.05 to 2, preferably from 0.5 to 1.5, % by weight of phosphorus in the form of phosphate and also generally from 0.1 to 3, preferably from 0.75 to 1.25, % by weight of zinc. The phosphorus can be present not only in the form of orthophosphate PO$_4^{3-}$ also in the form of pyrophosphate P$_2$O$_7^{4-}$.

The pigments of the invention have an acicular particle shape, are extremely finely divided, as is reflected in a specific surface area of generally $\geq 80$ m$^2$/g (measured in accordance with DIN 55 132 using an Areameter from Ströhlein, Düsseldorf, by the one-point difference method of Haul and Dümbgen), and are notable for a high transparency corresponding to a lightness difference $\Delta L^*$ of generally >45, measured in the paint according to the relation $\Delta L^* = L^*_{25°} - L^*_{70°}$, where $L^*$ is the lightness in the CIELAB system.

The yellow iron oxide pigments of the invention are usable with advantage for coloring paints, including in particular high-grade metallics and waterbornes, and also for coloring plastics and for producing wood glazes.

EXAMPLES

A) Preparation of yellow iron oxide pigments according to the invention

EXAMPLES 1 TO 7 a) To 6 l of a 10% strength by weight aqueous iron(II) sulfate solution (4.4 mol of FeSO$_4$.7 H$_2$O) in a 10 l stirred vessel equipped with stirrer, temperature and pH control means and gas inlet means for nitrogen and air, were added solutions of x g of phosphate and y g of zinc sulfate heptahydrate, respectively dissolved in 50 ml of water (Examples 1 to 4) or 100 ml of water (Examples 5 to 8). The solution obtained was heated to T$_a$°C. while nitrogen was passed in.

Then 5.28 mol of sodium hydroxide were added in the form of a 15% strength by weight aqueous solution to precipitate a % of the initially charged iron(II) in the form of iron(II) hydroxide.

Then an air stream of l$_a$ l/h was blown with stirring into the suspension for t$_a$ min until the pH decreased below 4.0 (Examples 1 to 4) or below 3.8 (Examples 5 to 8).

b) After the reaction mixture had been heated to T$_b$°C., the remaining iron(II) was precipitated over +$_b$ min in the form of FeOOH at a pH of 5.2, kept constant by continuous addition of 15% strength by weight of sodium hydroxide solution, while air was passed in at the same time at a rate of l$_b$ l/h.

The pigment was filtered off, washed and dried at 80° C.

Further details of these experiments and their results are summarized in Tables 1a and 1b.

TABLE 1A

| | | | | Reaction conditions of preparation | | | | | | |
|---|---|---|---|---|---|---|---|---|---|---|
| Ex. | x g phosphate | y g of ZnSO$_4$.7H$_2$O | T$_a$ [°C.] | Porportion a of iron precipitated in a) [%] | Air stream l$_a$ [l/h] | Time t$_a$ [min] | T$_b$ [°C.] | Air stream l$_b$ [l/h] | Time t$_b$ [min] | Space-time yield [g of FeOOH/l · h] |
| 1 | 11.6 H$_4$P$_2$O$_7$ (95%) | 6.88 | 35 | 60 | 1000 | 75 | 70 | 1000 | 40 | 25.5 |
| 2 | 11.6 H$_4$P$_2$O$_7$ (95%) | 6.88 | 45 | 60 | 1000 | 55 | 70 | 1000 | 35 | 33.0 |
| 3 | 7.55 H$_4$P$_2$O$_7$ (95%) | 6.88 | 30 | 60 | 1000 | 102 | 70 | 1000 | 37 | 21.0 |
| 4 | 11.8 Na$_4$P$_2$O$_7$.10 H$_2$O* | 11.96 | 35 | 60 | 2000 | 96 | 70 | 2000 | 59 | 18.9 |
| 5 | 11.8 Na$_4$P$_2$O$_7$.10 H$_2$O | 11.96 | 35 | 60 | 2500 | 80 | 80 | 1300 | 117 | 14.9 |
| 6 | 17.6 Na$_4$P$_2$O$_7$.10 H$_2$O | 4.40 | 35 | 60 | 2000 | 86 | 70 | 2000 | 46 | 22.2 |

TABLE 1A-continued

| | | | Reaction conditions of preparation | | | | | | |
|---|---|---|---|---|---|---|---|---|---|
| Ex. | x g phosphate | y g of ZnSO$_4$.7H$_2$O | T$_a$ [°C.] | Porportion a of iron precipitated in a) [%] | Air stream 1$_a$ [l/h] | Time t$_a$ [min] | T$_b$ [°C.] | Air stream 1$_b$ [l/h] | Time t$_b$ [min] | Space-time yield [g of FeOOH/l · h] |
| 7 | 11.8 Na$_4$P$_2$O$_7$.10 H$_2$O | 11.96 | 35 | 60 | 2000 | 50 | 70 | 2000 | 46 | 30.6 |

*The pyrophosphate solution was adjusted to pH 1.3 with sulfuric acid

EXAMPLE 8 a) To 600 l of a 1.0% strength-by weight aqueous iron(II) sulfate solution (127.5 kg of FeSO$_4$.7 H$_2$O) in a 1 m$^3$ stirred vessel were added solutions of 3.06 kg of tetrasodium pyrophosphate decahydrate and 703 g of zinc sulfate heptahydrate, each dissolved in water. After heating to 40° C. under nitrogen, 65% of the initially charged iron(II) was precipitated in the form of the hydroxide by adding 15% strength by weight sodium hydroxide solution. This precipitate was oxidized over 60 min to FeOOH nuclei by stirring and blowing in 30 m$^3$/h of air.

b) After the reaction mixture had been heated to 70° C., the remaining iron(II) was precipitated over 30 min in the form of FeOOH at a pH of 5.2, kept constant by continuous addition of 15% strength by weight sodium hydroxide solution, while air was passed in at the same time at a rate of 30 m$^3$/h.

The product was filtered off on a filter press, washed and dried at 80° C.

The space-time yield was 34 g of FeOOH/l·h. Further data concerning the pigment obtained are given in Table 1b.

EXAMPLE 9

1 kg of the pigment prepared in Example 8 was redispersed in 16 l of water. The dispersion obtained was heated to 70° C. 13.1 g of sodium dihydrogenphosphate dihydrate were added, and stirring was continued at that temperature for a further 30 min.

The product was filtered off, washed and dried at 80° C. Further data of the pigment obtained are given in Table 1b.

TABLE 1B

| | Characterization of pigments obtained | | | |
|---|---|---|---|---|
| | Specific surface area | Tap density | Content [% by weight] | |
| Ex. | [m$^2$/g]* | [g/cm$^3$] | Phosphorus | Zinc |
| 1 | 116.3 | 1.08 | 1.01 | 0.36 |
| 2 | 95.5 | 0.90 | 1.01 | 0.36 |
| 3 | 93.6 | 1.01 | 0.62 | 0.36 |
| 4 | 86.7 | 0.74 | 0.45 | 0.75 |
| 5 | 89.8 | 0.70 | 0.45 | 0.75 |
| 6 | 85.5 | 0.89 | 0.65 | 0.25 |
| 7 | 90.6 | 0.81 | 0.45 | 0.75 |
| 8 | 97.8 | 0.79 | 1.07 | 0.42 |
| 9 | 92.5 | | 1.34 | 0.42 |

*measured in accordance with DIN 66123 using an Areameter from Ströhlein, Düsseldorf, by the one-point difference method of Haul and Dümbgen B) Evaluation of coloristics For this the pigments obtained in A) were made into white reductions, metallic paints and waterborne paints and tested.

B1) White reduction:

4.5 g of pigment were dispersed in 85.5 g of an alkyd/melamine baking finish (solids content 45% by weight) using 300 g of glass balls (2 mm diameter) in a Scandex mixer (Christina Nau GmbH, Hagen) for 90 min. A mixture of 3 g of the colored paint thus obtained and 3 g of a 25% strength by weight titanium dioxide white paint was applied with a wire-wound draw bar to aluminum sheet.

B2) Metallic paint:

10.5 g of pigment were dispersed in 89.5 g of a combination of cellulose acetobutyrate and an isobutyletherified melamine-formaldehyde resin (Maprenal® MF 650, Hoechst) using 200 g of glass balls (1 nun diameter) in a Scandex mixer for 4 h. A mixture of 19.05 g of the colored paint thus obtained and 50 g of an aluminum paint with a pigment content of 4% strength by weight was applied to an aluminum sheet in hiding thickness. After flashoff, the paint was clear-coated and baked at 130° C.

B3) Waterborne paint:

10 g of pigment were ground for 90 min on a Scandex mixer with 300 g of zirconium balls (1.5 mm diameter) in 100 g of an aqueous grinding resin prepared as described in EP-A-228 003 following addition of 26 g of water. Then a further 64 g of binder were added and the mixture was shaken for 5 min.

To prepare a white reduction, 5 g of the colored paint thus obtained were mixed with 5.16 g of 37% strength by weight white paint.

Furthermore, 5 g of the colored paint obtained were mixed with 10 g of a 3% strength by weight aluminum paint to prepare a metallic paint.

Both the paints were applied in a hiding thickness and given a clear overcoat.

The specimens prepared were colorimetrically measured according to the CIELAB system. The measuring instruments used were the Zeiss spectrophotometer RFC 16 and the Zeiss goniospectrophotometer Datacolor GK 111 for angle-dependent measurements (measuring angles 25, 45 and 70°).

The results of these investigations (hue angle [°]=HGD, chroma C*, lightness L*) are summarized in Tables 2a, 2b and 2c.

TABLE 2A

| | Assessment of coloristics | | |
|---|---|---|---|
| | White reduction | | |
| Ex. | Hue [°] | Chroma C* | Lightness L* |
| 3 | 74.7 | 40.3 | 74.2 |
| 4 | 75.4 | 40.7 | 74.0 |
| 8 | 74.9 | 40.0 | 73.4 |

TABLE 2B

| Assessment of coloristics | | | | | | | | |
|---|---|---|---|---|---|---|---|---|
| Metallic | | | | | | | | |
| Measuring angle 25° | | | Measuring angle 45° | | | Measuring angle 70° | | |
| HGD | C* | L* | HGD | C* | L* | HGD | C* | L* |
| 88.4 | 34.7 | 94.7 | 89.3 | 26.0 | 62.5 | 88.9 | 21.5 | 43.3 |
| 88.9 | 36.0 | 96.0 | 89.4 | 27.1 | 63.1 | 88.5 | 22.3 | 43.0 |

TABLE 2B-continued

| | Assessment of coloristics | | | | | | | |
|---|---|---|---|---|---|---|---|---|
| | | | Metallic | | | | | |
| Measuring angle 25° | | | Measuring angle 45° | | | Measuring angle 70° | | |
| HGD | C* | L* | HGD | C* | L* | HGD | C* | L* |
| 87.3 | 36.0 | 93.0 | 88.2 | 27.2 | 63.0 | 88.4 | 22.1 | 45.5 |

TABLE 2C

| | Assessment of coloristics | | | | | | | | | | | | |
|---|---|---|---|---|---|---|---|---|---|---|---|---|---|
| | | | | Waterborne | | | | | | | | | |
| | White reduction | | | | | | Metallic | | | | | | |
| | (1/9 standard depth of shade) | | | Measuring angle 25° | | | Measuring angle 45° | | | Measuring angle 70° | | | |
| Ex. | FAE[a] | HGD | C* | L* | HGD | C* | L* | HGD | C* | L* | HGD | C* | L* |
| 9 | 98 | 75.6 | 38.3 | 72.4 | 93.9 | 24.1 | 104.9 | 94.5 | 15.9 | 59.1 | 93.1 | 13.3 | 37.3 |

[a]FAE = color equivalent, based on the commercial product Sicotrans ® Yellow L 2916 as standard (FAE 100)

We claim:

1. A process for preparing transparent yellow iron oxide pigments by precipitation of iron(II) hydroxide by adding an inorganic base to an iron(II) salt solution and subsequent oxidation to FeOOH, which comprises
   a) admixing an at least 0.7M aqueous iron(II) salt solution at from 25° to 45° C. in the presence of dissolved phosphates in an amount of at least 0.45% by weight of phosphorous, based on FeOOH, and optionally zinc salts initially with sufficient base to precipitate from 50 to 70% of the starting iron(II) ions in the form of the hydroxide and then passing oxidizing gas through the resulting mixture until the pH has fallen to a value <4.5, and
   b) then raising the temperature of the mixture to 50°–80° C. and, by further addition of base while a pH of from 4 to 6 is maintained and the simultaneous introduction of oxidizing gas, completing the precipitation of the iron in the form of FeOOH and then isolating the precipitated transparent pigment from the aqueous suspension.

2. A process as claimed in claim 1, wherein the precipitation of step a) is carried out in the presence of dissolved phosphates and zinc salts.

3. A process as claimed in claim 1, wherein the precipitation of step a) is carried out in the presence of from 0.05 to 2% by weight of phosphorus in the form of phosphate, based on FeOOH.

4. A process as claimed in claim 1, wherein the precipitation of step a) is carried out in the presence of from 0.1 to 3% by weight of zinc, based on FeOOH.

5. A process as claimed in claim 1, wherein, before it is isolated or after it has been isolated and then redispersed in an aqueous phase, the pigment is additionally coated with a phosphate.

6. A process as claimed in claim 5, wherein the pigment is additionally coated with from 0.1 to 1% by weight of phosphorus in the form of phosphate.

7. Transparent yellow iron oxide pigments based on doped FeOOH, wherein the dopant comprises
   A) from 0.05 to 2% by weight of phosphorus in the form of phosphate and
   B) from 0.1 to 3% by weight of zinc.

8. A method of coloring polymeric material, which comprises mixing said polymeric material with the pigments of claim 7.

* * * * *